United States Patent
Grosso (10) Patent No.: US 10,438,220 B2
(45) Date of Patent: Oct. 8, 2019

(54) DYNAMIC PSYCHOLOGICALLY FRIENDLY PRICING

(71) Applicant: Scientific Revenue, Inc., San Mateo, CA (US)

(72) Inventor: William Grosso, San Mateo, CA (US)

(73) Assignee: Scientific Revenue, Inc., San Mateo, CA (US)

(*) Notice: Subject to any disclaimer, the term of this patent is extended or adjusted under 35 U.S.C. 154(b) by 497 days.

(21) Appl. No.: 15/026,060

(22) PCT Filed: Oct. 7, 2014

(86) PCT No.: PCT/US2014/059559
§ 371 (c)(1),
(2) Date: Mar. 30, 2016

(87) PCT Pub. No.: WO2015/054306
PCT Pub. Date: Apr. 16, 2015

(65) Prior Publication Data
US 2016/0232547 A1    Aug. 11, 2016

Related U.S. Application Data (60) Provisional application No. 61/887,913, filed on Oct. 7, 2013, provisional application No. 61/887,918, filed
(Continued)

(51) Int. Cl.
*G06Q 10/00* (2012.01)
*G06Q 30/02* (2012.01)

(52) U.S. Cl.
CPC ......... *G06Q 30/0206* (2013.01); *G06Q 30/02* (2013.01)

(58) Field of Classification Search
None
See application file for complete search history.

(56) References Cited

U.S. PATENT DOCUMENTS 6,480,885 B1   11/2002   Olivier
7,233,928 B2   6/2007    Huerta et al.
(Continued)

FOREIGN PATENT DOCUMENTS

WO   WO 2000/038093   6/2000
WO   WO 2001/001304   1/2001
(Continued)

OTHER PUBLICATIONS

Optimize In-App Purchasing with Behavior Analytics, Oct. 20, 2014, https://www.cooladata.com/blog/optimize-IAP, p. 1-6.*
(Continued)

*Primary Examiner* — Eric W Stamber
*Assistant Examiner* — Joseph M Waesco
(74) *Attorney, Agent, or Firm* — Knobbe, Martens, Olson & Bear, LLP (57) ABSTRACT

A system for dynamic psychologically friendly pricing comprising a pricing engine that may generate payment structures and price values, a customer segmentation server that may analyze user behavior, and a pricing analysis server that proposes new price values based on analysis results, and methods for the generation and modification of payment structures.

9 Claims, 8 Drawing Sheets

Related U.S. Application Data on Oct. 7, 2013, provisional application No. 61/887,923, filed on Oct. 7, 2013.

(56) References Cited

U.S. PATENT DOCUMENTS

| | | | |
|---|---|---|---|
| 8,234,225 B2 | 7/2012 | Davis et al. | |
| 8,260,657 B1 | 9/2012 | Conway | |
| 8,484,730 B1* | 7/2013 | P. R. | G06F 11/3438 |
| | | | 709/225 |
| 8,920,243 B1 | 12/2014 | Curtis et al. | |
| 2002/0169703 A1* | 11/2002 | Lutnick | G06Q 30/06 |
| | | | 705/37 |
| 2006/0128471 A1 | 6/2006 | Willis et al. | |
| 2007/0179846 A1* | 8/2007 | Jain | G06Q 30/02 |
| | | | 705/14.53 |
| 2007/0233585 A1* | 10/2007 | Ben Simon | G06Q 40/00 |
| | | | 705/35 |
| 2008/0011844 A1* | 1/2008 | Tami | G06Q 20/204 |
| | | | 235/385 |
| 2008/0097842 A1* | 4/2008 | Tirumala | G06Q 30/02 |
| | | | 705/14.43 |
| 2008/0270398 A1* | 10/2008 | Landau | G06Q 30/02 |
| 2009/0083122 A1* | 3/2009 | Angell | G06Q 10/0631 |
| | | | 705/7.33 |
| 2010/0049679 A1* | 2/2010 | Phillips | G06Q 30/02 |
| | | | 706/15 |
| 2010/0057586 A1* | 3/2010 | Chow | G01S 19/14 |
| | | | 705/26.1 |
| 2010/0250714 A1* | 9/2010 | Wehmann | G06Q 30/02 |
| | | | 709/220 |
| 2010/0324956 A1* | 12/2010 | Lopez | G06F 17/5004 |
| | | | 705/7.37 |
| 2010/0332355 A1* | 12/2010 | Lopez | G06F 17/5004 |
| | | | 705/27.1 |
| 2011/0029362 A1* | 2/2011 | Roeding | G06Q 30/00 |
| | | | 705/14.13 |
| 2011/0213649 A1* | 9/2011 | Mesaros | G06Q 30/02 |
| | | | 705/14.23 |
| 2011/0231819 A1* | 9/2011 | Tanner | G06Q 30/02 |
| | | | 717/123 |
| 2011/0251868 A1* | 10/2011 | Mikurak | G06Q 10/06 |
| | | | 705/7.25 |
| 2011/0282791 A1 | 11/2011 | Anderson | |
| 2012/0060142 A1* | 3/2012 | Fliess | G06F 8/70 |
| | | | 717/102 |
| 2012/0078706 A1* | 3/2012 | Rajagopalan | G06Q 30/00 |
| | | | 705/14.41 |
| 2012/0136876 A1 | 5/2012 | Marshall et al. | |
| 2012/0142429 A1 | 6/2012 | Muller | |
| 2012/0221430 A1* | 8/2012 | Naghmouchi | G06Q 30/0283 |
| | | | 705/26.7 |
| 2012/0259722 A1* | 10/2012 | Mikurak | G06Q 10/087 |
| | | | 705/26.1 |
| 2012/0296840 A1* | 11/2012 | Vogel | G06Q 30/0283 |
| | | | 705/342 |
| 2013/0346987 A1* | 12/2013 | Raney | G06F 9/5044 |
| | | | 718/102 |
| 2014/0172687 A1 | 6/2014 | Chirehdast | |
| 2014/0222610 A1* | 8/2014 | Mikurak | G06Q 10/087 |
| | | | 705/26.5 |
| 2014/0310036 A1 | 10/2014 | Grosso | |
| 2015/0081377 A1* | 3/2015 | Brereton | G06Q 30/0206 |
| | | | 705/7.28 |
| 2015/0269617 A1* | 9/2015 | Mikurak | G06Q 10/087 |
| | | | 705/14.54 |
| 2016/0232548 A1* | 8/2016 | Grosso | G06Q 30/0283 |
| 2016/0267509 A1* | 9/2016 | Grosso | G06Q 30/0206 |
| 2016/0328722 A1 | 11/2016 | Grosso | |
| 2018/0068350 A1 | 3/2018 | Grosso | |
| 2018/0361253 A1 | 12/2018 | Grosso | |

FOREIGN PATENT DOCUMENTS

| | | |
|---|---|---|
| WO | WO 2004/061601 | 7/2004 |
| WO | WO 2012/162387 | 11/2012 |
| WO | WO 2015/054306 | 4/2015 |
| WO | WO 2015/054310 | 4/2015 |
| WO | WO 2015/054316 | 4/2015 |

OTHER PUBLICATIONS

U.S. Appl. No. 15/056,711, filed Feb. 29, 2016, Grosso.
U.S. Appl. No. 16/002,487, filed Jun. 7, 2018, Grosso.
International Search Report for PCT/US2014/059559, dated Jan. 29, 2015.
International Search Report for PCT/US2014/059564, dated Feb. 5, 2015.
International Search Report for PCT/US2014/059571, dated Feb. 5, 2015.

* cited by examiner

DYNAMIC PSYCHOLOGICALLY FRIENDLY PRICING

CROSS-REFERENCE TO RELATED APPLICATIONS

This application claims the benefit of, and priority to, U.S. provisional patent application 61/887,913, titled "DYNAMIC PSYCHOLOGICAL PRICING", filed on Oct. 7, 2013, and also claims the benefit of, and priority to, U.S. provisional patent application 61/887,918, titled "PARAMETERIZED PRICING", filed on Oct. 7, 2013, and also claims the benefit of, and priority to, U.S. provisional patent application 61/887,923, titled "PRICING CONFIGURATION AND AUTOMATION", filed on Oct. 7, 2013, the entire specifications of each of which are incorporated herein by reference in their entirety.

BACKGROUND OF THE INVENTION

Field of the Art

The disclosure relates to the field of dynamic pricing, and more particularly to the field of behavior-based pricing.

Discussion of the State of the Art

The emergence of large-scale online gaming communities, and the more recent arrival of mobile gaming as a major market, have presented dramatic opportunities for merchants. Users of online and mobile games have shown a willingness to make in-app (or in-game) purchases, generally of virtual goods (e.g., points, game items, game capabilities, etc.), and provide vendors with a rich variety of behavior data. In such a data rich, behaviorally complex environment, pricing becomes a very complex art. In the art, few tools are available to facilitate pricing of in-app or in-game items, and most such pricing is done manually and in an ad hoc fashion. A great deal of "tribal knowledge" rules in this area, with thumbrules and ideas that may work in the physical commerce world of bricks-and-mortar retailers are assumed to be valid in the online and mobile gaming worlds (and similar areas, such as online gambling, online education, digital media, and the like).

What is clearly needed is a system that brings science to the world of pricing in online environments, and that enables highly automated, adaptive, dynamic pricing of in-game, in-app, or equivalent items.

SUMMARY OF THE INVENTION

Accordingly, the inventor has conceived and reduced to practice, in a preferred embodiment of the invention, a system and methods for dynamic psychologically friendly pricing of in-app or in-game merchandise in online or mobile application environments, via a dynamic pricing system that produces price values based on customer behavior, in an online digital entertainment environment.

According to a preferred embodiment of the invention, a system for dynamic psychologically friendly pricing of in-app or in-game merchandise in online or mobile application environments via a dynamic pricing system that produces price values based on customer behavior, in an online digital entertainment environment, comprising a pricing console computer comprising program code stored in a memory and adapted to operate an interface for receiving user interaction, a database computer comprising program code stored in a memory and adapted to store information from the other components of the system, a pricing engine computer comprising program code stored in a memory and adapted to generate at least a plurality of parameterized price values, a pricing analysis server computer comprising program code stored in a memory and adapted to analyze at least the price values and provide the analysis results to the pricing console, and a customer segmentation server computer comprising program code stored in a memory and adapted to receive customer interactions via a digital packet network and to generate customer behavior data values based at least in part on those interactions, and to provide the behavior data values to the pricing engine, is disclosed.

According to another preferred embodiment of the invention, a method for generating psychologically friendly pricing of in-app or in-game merchandise in online or mobile application environments, comprising the steps of defining, using a pricing engine computer comprising program code stored in a memory and adapted to generate at least a plurality of parameterized price values, a plurality of price equivalence relations, selecting an interval of parameterized price values, dividing the interval into equivalence classes based at least in part on a price equivalence relation, ranking the equivalence classes, and selecting the ideal price based at least in part on the equivalence ranking, is disclosed.

According to another preferred embodiment of the invention, a method for dynamic configuration of parameterized psychologically friendly payment structures used for pricing of in-app or in-game merchandise in online or mobile application environments, comprising the steps of establishing, using a pricing engine computer comprising program code stored in a memory and adapted to generate at least a plurality of parameterized price values, a psychologically friendly payment structure, receiving, using a customer segmentation server computer comprising program code stored in a memory and adapted to receive customer interactions via a digital packet network and to generate parameterized data values based at least in part on those interactions, and to provide the behavior data to the pricing engine, customer behavior data, analyzing, using a pricing analysis server computer comprising program code stored in a memory and adapted to analyze at least the price values and provide the analysis results to the pricing console, the behavior data, generating proposed payment structure values based at least in part on the analysis, providing the proposed payment structure values to the pricing engine, and updating the payment structure to reflect the new values, is disclosed.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

The inventor has conceived, and reduced to practice, a system and methods for dynamic psychologically friendly pricing of in-app or in-game merchandise in online or mobile application environments via a dynamic pricing system that produces price values based on customer behavior, in an online digital entertainment environment.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 1:
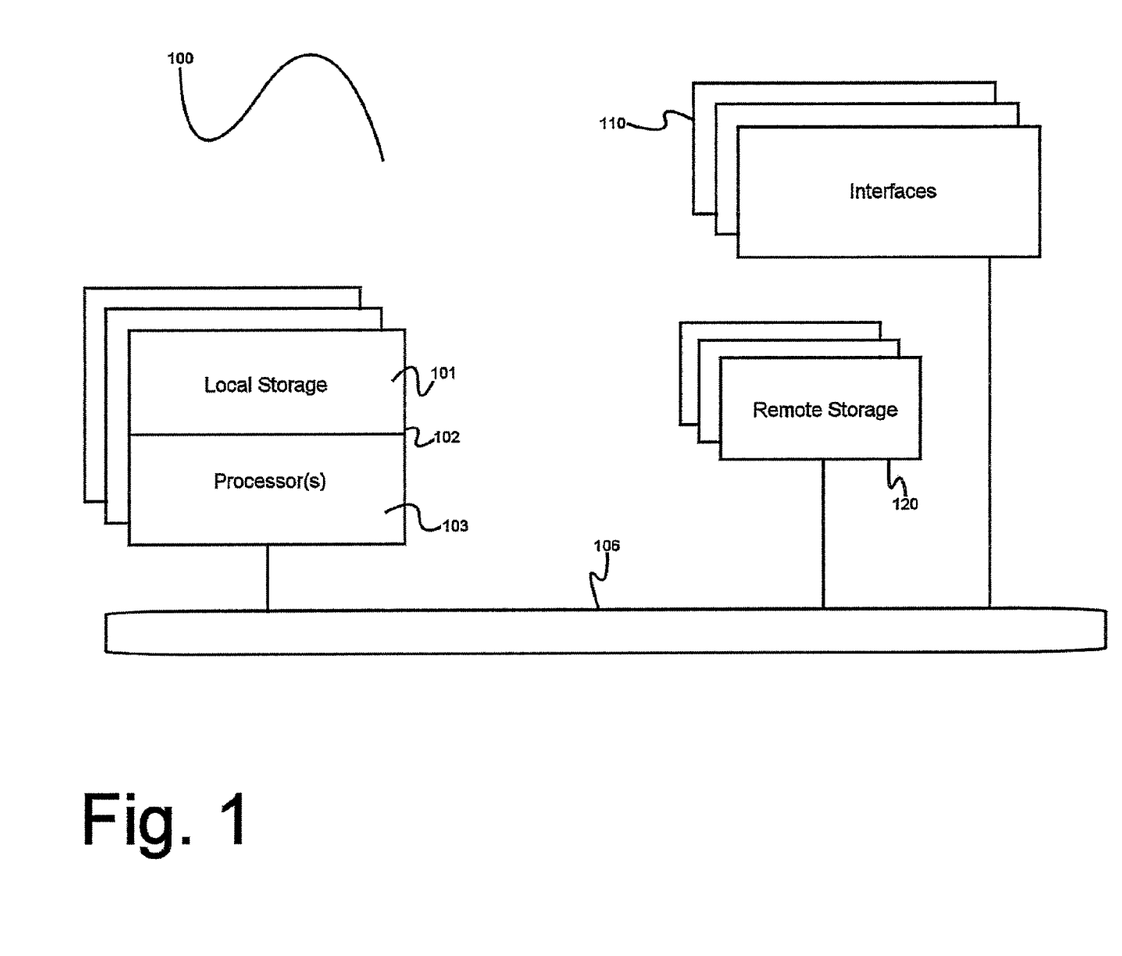
FIG. 1 is a block diagram illustrating an exemplary hardware architecture of a computing device used in an embodiment of the invention.

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
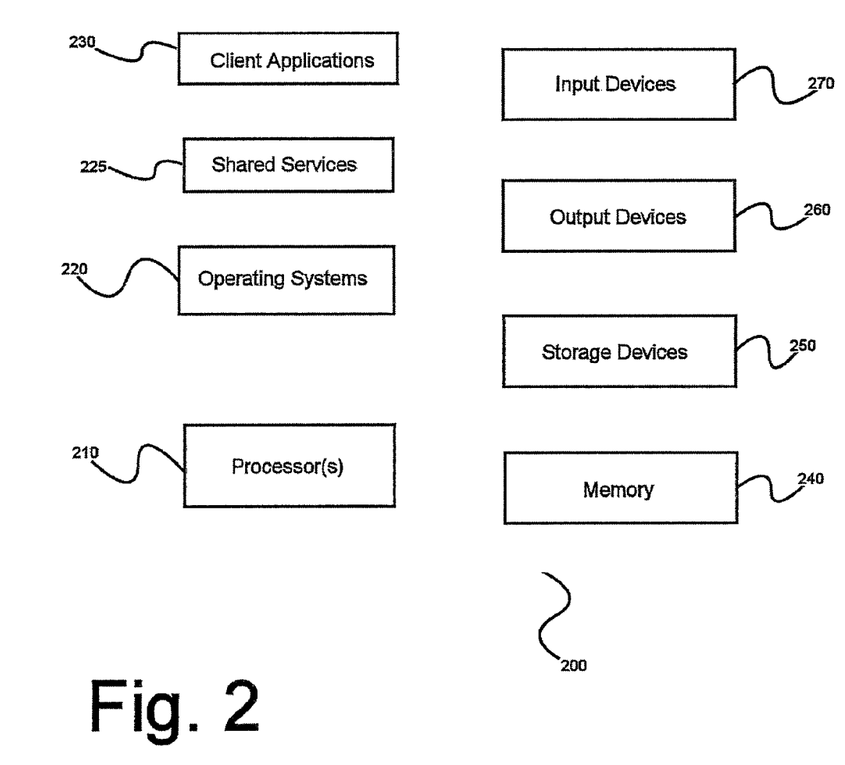
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200, and may be useful for providing common services to client applications 230. Services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form (such as those described above, referring to FIG. 1). Examples of storage devices 250 include flash memory, magnetic hard drive, CD-ROM, and/or the like.

Figure 3:
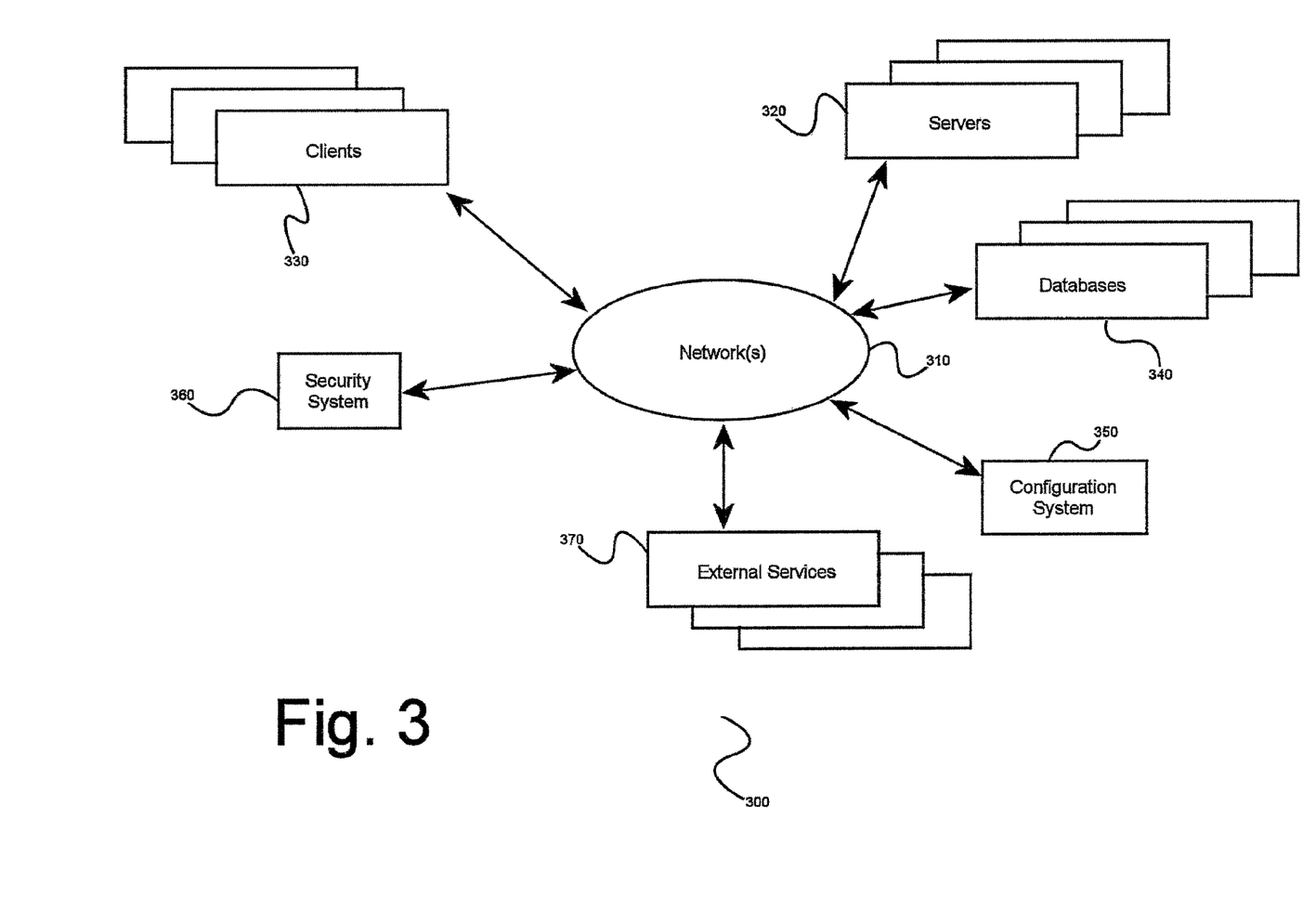
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
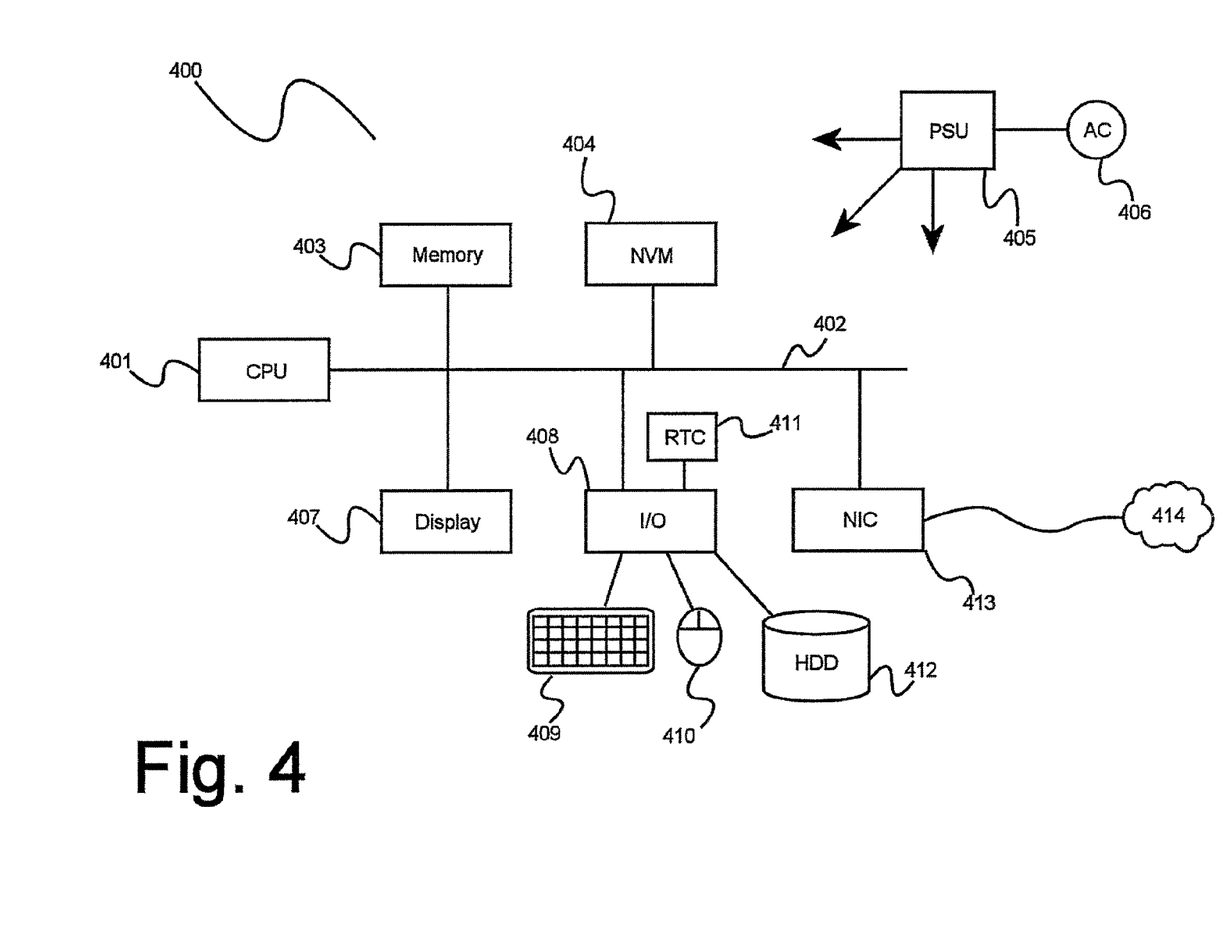
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 5:
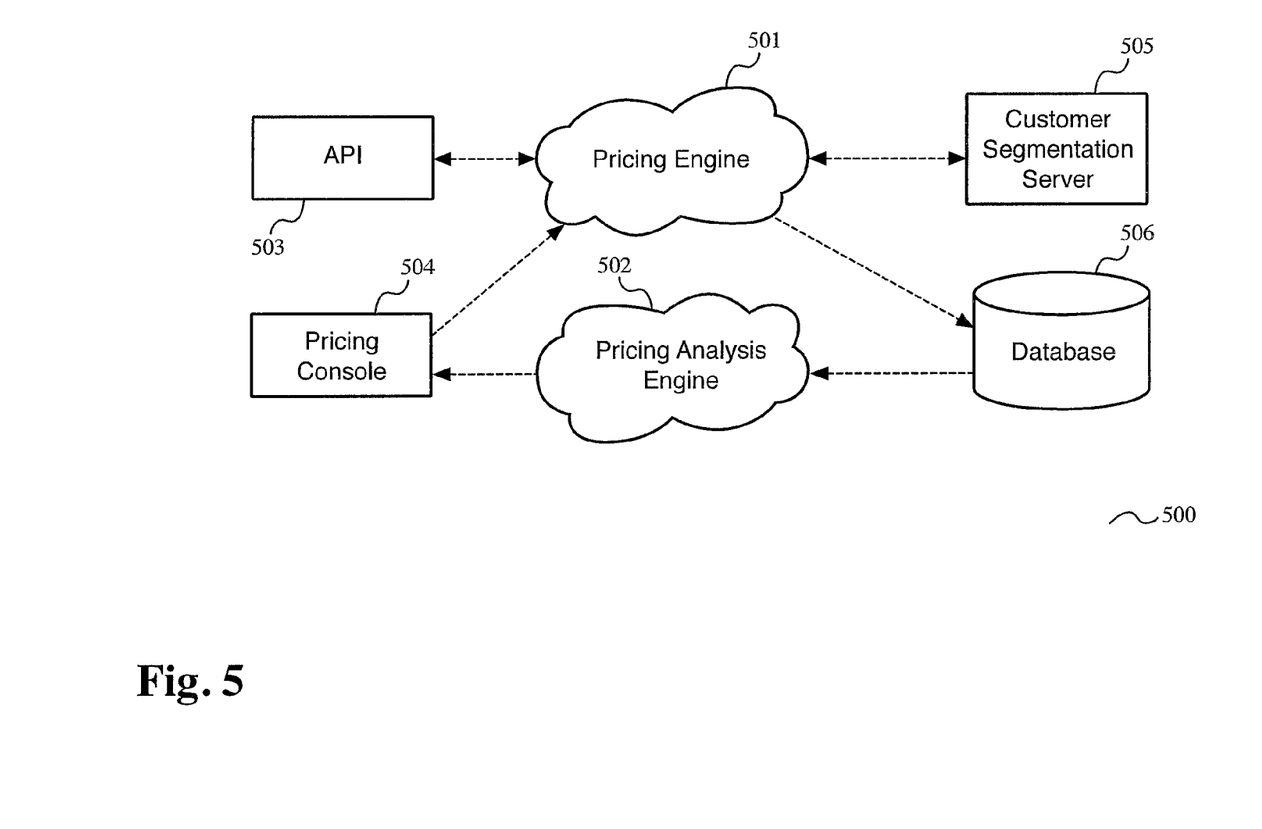
FIG. 5 is a system architecture diagram illustrating an exemplary system for dynamic psychologically friendly pricing, according to a preferred embodiment of the invention.

FIG. 5 is a system architecture diagram illustrating an exemplary system 500 for dynamic psychologically friendly pricing, according to a preferred embodiment of the invention. According to the embodiment, a pricing engine 501 computer may be a computer comprising at least program code stored in a memory and adapted to generate a plurality of price values such as for use in payment systems for online entertainment (hereinafter referred to as "paywalls"), and may be connected such as via a digital packet network (such as the Internet or other suitable communication network) to other components of a system 500, such as a database 506 that may be a computer comprising at least program code stored in a memory and adapted to facilitate storage of information from a pricing engine 501 or other components of a system 500. System 500 may further comprise a software application programming interface (API) 503 that may comprise at least program code adapted to facilitate integration or communication with any of a variety of external or third-party products or services, such as including but not limited to software-based services such as social media networks or websites, or physical devices such as personal computers or smartphones, or any other such device that may operate program code and communicate via a network, and any variety or quantity of such external or third-party products or services may be utilized simultaneously or interchangeably according to the embodiment.

Further according to the embodiment, a customer segmentation server 505 may be a computer comprising at least program code stored in a memory and adapted to receive and interpret customer behavior data (such as may be provided by an API 503), for example to categorize, sort, or otherwise identify customers or other users based on observable behavior information. Customer segmentation server 505 may then provide customer segmentation information to a pricing engine 501 such as for use in producing price values, for example to determine appropriate values based on known customer behavior to increase likelihood of a purchase, or to offer promotions or bonuses based on certain behaviors or behavior patterns (for example, rewarding loyal customer with a high purchase history, or offering a temporary discount to someone who has been observed considering a purchase for some time, but has not committed).

Further according to the embodiment, a pricing analysis engine 502 may be a computer comprising at least program code stored in a memory and adapted to perform analysis of at least a plurality of price value data, such as may be provided by a pricing engine 501 or retrieved from a database 506. Such analysis may comprise, for example, determining the "psychological friendliness" of pricing values as discussed in detail below, or analysis of price values with regard to known customer or user behaviors or activities such as to determine the effectiveness of a pricing strategy or user or demographic-specific pricing optimizations. Additionally, a pricing console 504 may be a computer comprising at least program code stored in a memory and adapted to receive interaction from a human user, for example via a software-based interface that may optionally present data from components of a system 500 as well as accept input such as to facilitate interaction with, or control of, other components of a system 500. In this manner, a user may be able to review the operations of various components or activities within a system 500, as well as provide input to assist in configuring or directing operations, for example to enable a human review analyst to further optimize operation using information external to a system (such as new policies that may affect pricing, for example).

DETAILED DESCRIPTION OF EXEMPLARY EMBODIMENTS

Figure 6:
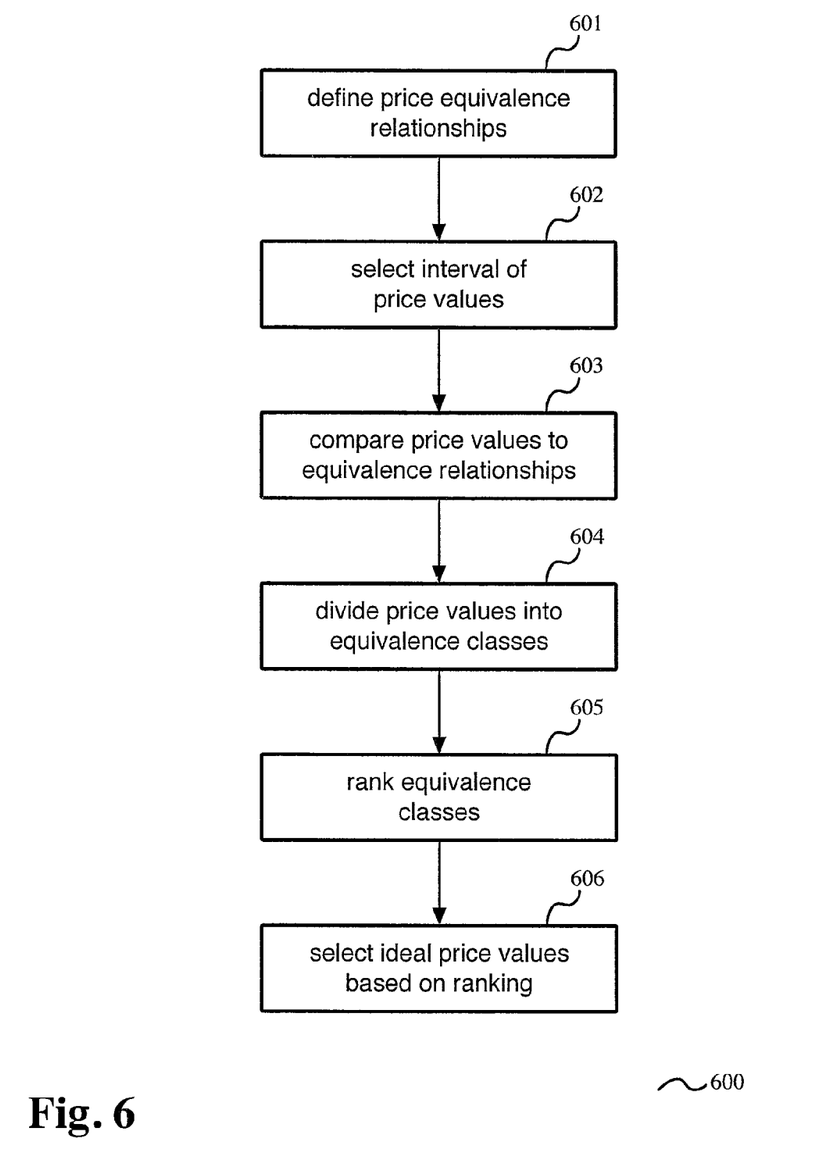
FIG. 6 is a method flow diagram illustrating an exemplary method for generating psychologically friendly pricing values, according to a preferred embodiment of the invention.

FIG. 6 is a method flow diagram illustrating an exemplary method 600 for generating psychologically friendly pricing values, according to a preferred embodiment of the invention. In an initial step 601, a pricing engine may define a plurality of price equivalence relationships (such as for example, in the examples described below), generally for such purposes as relating a plurality of price values to one another to make determinations regarding their psychological-friendliness or other qualities that may be relevant to their appropriateness in any given setting (such as, for example, an online paywall in an electronic entertainment application or service). In a next step 602, the pricing engine may select a range of price values such as based on an initial price value or an equivalence relation, as appropriate according to a particular arrangement. In a next step 603, the range of price values may then be compared to the equivalence relationships, such as to determine suitable specific values from within the range, or to determine relationships between specific values based on known relationship rules (as described below in the pricing examples). In a next step 604, the price range (or optionally, a subset of specific price values selected from the range in a previous step) may be divided into "equivalence classes", such as based at least in part on the equivalence relations from a prior step 601, such as to classify groups of prices based on their suitability for a particular use or other qualifications as may be determined from the comparisons performed according to the embodiment. These equivalence classes may then, in a next step 605, be ranked or otherwise organized such as based on their relative suitability or other qualifications, for example to determine an ideal subset of potential price values for an application. In a final step 606, a specific ideal price value or subset of values may then be selected for the particular application, such as based at least in part on the relative ranking of an equivalence class they belong to, or any other such qualifications as may be determined according to the embodiment. In this manner, a range of potential price values may be readily reduced to a select few or even a specific single value that may be seen as ideal for a particular use.

The following are explanations and examples of psychological pricing effects and how they may be used to produce psychologically friendly price values according to the invention (as described above, referring to FIG. 6), however it should be appreciated that these are merely exemplary and additional or alternate means of deriving psychologically friendly prices may be utilized simultaneously or alternately according to the invention, for example if new research indicates alternate algorithms or approaches that may be effective.

The Left Digit Effect

It has been shown that people perceive a price ending in "9" to be much less than the 1 cent increment when the one cent increment causes the left most digit to increase. That is, the prices $1.79 and $1.80 are very close together, both in fact and in perception. However, $1.99 and $2.00 are very close together in fact but are perceived as being far apart (this is known as the left digit effect).

The left digit effect is more effective for larger numbers. People generally read left to right (there are some exceptions in various world cultures, however the effects described can be readily adapted to accommodate this), and $29.99 is heuristically pegged at $2xxxx (20). The left digit effect has more impact on comparisons when values are closer together: When choosing between $100 and $4.99, versus $100 and $5.00, the left digit effect has no impact (the relative magnitude of the prices under consideration dwarfs the effect). Additionally, the left digit effect has been shown in studies to be a universal phenomenon (not cultural and not restricted to pricing).

Odd Pricing

Odd prices have been shown to be more effective at converting people. Odd prices may be considered to be any prices meeting any of the following criteria: within 1 cent of the nearest 10 cents; prices that are within 5 cents of the nearest whole dollar; $1 of the nearest round dollar amount; or $5 of the nearest $100 or $1000 amount.

This is an older definition, but there is empirical research to indicate that this also helps things out. Note that these define separate buckets by treating them as disjoint criteria (e.g. "matches the second bullet point, but not the first").

When testing how many prices or choices to offer, whether to sort in ascending or descending order, or how big a gap to use in the pricing, the results show that descending prices worked slightly better (intriguingly enough, "random order" and "ascending order" worked just about the same). Note however that descending order works better because of loss aversion (as shown by Kahneman and Tversky). It has been further shown that 4 choices worked best, then 5 choices of price. 3 choices didn't perform as well. Having a wide range of prices worked best. The effects demonstrated are pretty weak; regression analysis indicates that age and gender are more powerful predictors of how much will be spent.

Patterns of Rightmost Digits Used in Advertised Prices: Implications for Nine-Ending Effects Patterns of rightmost digits can be used to invoke prospect theory in a novel way. It has been shown that people conceptualize prices "ending in 9" as "higher price+discount" (perceived gain effect). The net effect is that prices ending in 9 have a slight statistical bias. When busy doing other things, or otherwise distracted or under cognitive stress (such as when playing games), people truncate to simplify price processing, a phenomenon known as the "underestimation effect". This means that a price ending in 9 is cognitively viewed as much lower than it really is. Prices ending in "1" do not have much impact from this effect, and should generally be avoided. Numbers ending in 0 or 5 are "cognitively more accessible" and easier to remember and understand. This has two impacts: prices should ideally never end in 0 or 5 (in the psychologically friendly model). Pricing managers and algorithms can use this to put cognitive barriers in front of people who want to compare prices; and an amount should end in 0 (not 5).

Increased Consumer Sales Response Through Use of 99 Ending Prices

The use of prices ending in "0.99" shapes the spending distribution. Tests have been performed involving sending out a mail order catalog with prices ending in "0.00" and "0.99", and found out that "0.99 prices" had more purchases, and also that when outliers were removed, "0.99 prices" had a statistically significant larger basket size. People effectively upsold themselves when prices ended in "0.99".

People have been conditioned to view prices ending in 9 as signifying a sale or deal. This has a slight, but statistically valid, effect.

Net Impact

Research from retail indicates the following exemplary payment wall design will typically be 4% to 5% more effective than a well-designed but not carefully designed payment wall (e.g. a typical wall, but not a poorly-designed wall). The wall may comprise 4 or 5 price slots, utilize descending prices (in a volume discount scenario, which is the usual case for virtual currencies, the most expensive option, which has the highest percentile discount, may be presented first to maximize the impact of loss aversion), default to the second most expensive price available, and on the "bottom half" of the wall may start with something unfriendly in price (but friendly in amount) and on the "top half of the wall" go to more psychologically friendly prices, stay friendly in amount.

How Psychologically Friendly Prices Work

Begin by defining an equivalence relation on prices: price 1 is equivalent to price 2 if there is no left digit effect distinguishing between them; and they are both odd prices and equivalent in the sense listed above ("Note that these define separate buckets by treating them as disjoint criteria (e.g. "matches the second bullet point, but not the first").

This is an equivalence relation (in particular, it's transitive). Note, however, that many prices wind up being equivalent to themselves. This may be used as follows: begin by taking an interval from [proposed price*0.9] to [proposed price]+0.01 (note that the 0.01 is important—it lets $4.99 double to get $9.99. That is, when the price point at 4.99 is doubled to build a full payment wall, the addition of 0.01 brings the new value from 9.98 to 9.99); divide the price interval into equivalence classes; and rank order the equivalence classes. Ranking may be as follows: the left digit effect is the most important ranking for equivalence classes, so prefer equivalence classes with a "better" left digit effect; equivalence classes containing a 0.99 are better than ones that don't contain 0.99, otherwise order them by price (descending order). Then, from the best equivalence class: if there is a price ending in "9", choose the highest price ending in 9; otherwise, if there is a price ending in "5", choose the highest price ending in 5; otherwise, choose the highest price.

It is important to note that this may generally result in selecting a price that ends in "0.9". How this works (Example 1): begin with an exemplary proposed price of $3.73; then select a range from 3.35 to 3.74. These all have the same left digit (3). The buckets from odd pricing may include: "within 1 cent of the nearest 10 cents": 3.39, 3.49, 3.59, 3.69; "within 5 cents of the nearest whole dollar": none; "within $1 of the nearest round dollar amount": none; and "within $5 of the nearest 100 dollar amount": none. Therefore, the price should be $3.69.

How this works (Example 2): given an exemplary proposed price of $10.18, select a range from 9.16 to 10.19; the left digit effect: 9 is better than 10. Effective range is now 9 to 9.99. Logic continues as above, and the final price selected should be $9.99.

How Psychologically Friendly Currency Amounts Work

In some ways, this is the opposite of psychologically friendly prices. In psychologically friendly prices, define equivalence classes and then choose the one that is, in some sense, "psychologically lowest", such as taking into account the left-digit effect and the ease of "mental math" for customers. It may be difficult for a customer to quickly double things that don't end with zero.

An exemplary algorithm may comprise the following steps: first, look at the range from the amount to the amount multiplied by 1.1; then choose the subset that maximizes the left digit effect; and lastly choose the amount that ends in the most zeroes (simpler math).

A complete algorithm, in brief: first begin with a base price; generate the amount of currency incrementally (generate all of them; applying psychological reasoning where appropriate); translate the base price to all the foreign currencies using the appropriate conversion amounts (forex or forex-and-ppp); for each currency, "walk up the table"; multiply the previous rows price by the currency multiplier; apply the discount exchange rate; make it psychologically friendly if required; and finally iterate.

Worked Example (Only in USD)

As an example, a customer may want to sell 100 gold coins for $1.43 (starting exchange rate). In this example, the customer has chosen to: use psychologically friendly prices for the more expensive half of the payment wall; use psychologically friendly amounts throughout; double the currency at each stage; use 5 slots; and use a discounting of 0, 10%, 10%, 15%.

First, compute the amounts. Doubling leads to cognitively accessible numbers. Row 1: 100 coins; row 2: 200 coins; row 3: 400 coins; row 4: 800 coins; and row 5: 1600 coins.

Row 1's price is easy as well—it's just $1.43; Row 2's price is easy as well—it's just $2.86 (since there's no discount and no psychologically friendly amount). Row 3 gets a little complex: start with $5.72; a 10% discount leads to $5.14; the range is $4.63 to $5.15; the selected price is $4.99.

Row 4: start with $9.98; a 10% discount leads to 8.98; the range is 8.08 to 8.99; the price is $8.99. Row 5: start with 17.98; a 15% discount leads to $15.28; the range is 13.75 to $15.29; the price is $14.99. The net wall: 100 gold coins for $1.43; 200 gold coins for $2.86; 400 gold coins for $4.99; 800 gold coins for $8.99; 1600 gold coins for $14.99. Additionally, specific paywall items or lines may be indicated with additional sales qualifiers, for example "best deal!" or "most popular!", to encourage buyers to tend toward specific target purchases.

Dynamic Bonusing

Further according to the invention, the notion of dynamic pricing may include "dynamic bonusing", such as by utilizing dynamic personalized messaging to "hide" discriminatory pricing—for example, in the context of online gaming, if a player is a "grinder" (i.e., someone who plays many hours and displays devoted interest in maximizing their gameplay), they might be offered a "loyal player bonus". Additionally, systematic avoidance of discounts may be employed to avoid re-framing prices at a lower level.

Classical economics measures price elasticity in terms of a fixed, population-constant, price for a single good (and then measure take rates, in essence). According to the invention, payment walls may have multiple prices for the same good, in terms of bundling. The measure of goodness is not short-term sale, but lifetime value of the customer. This boils down to a substantial change in the underlying conceptual model for price elasticity In-Game Items, Digital Media, Incentives The above descriptions use examples focused on digital currency, but it should be appreciated that the methods described are fully applicable to other forms of digital goods, and furthermore that virtual goods may be incorporated as part of the bonus and price adjustment system ("Buy 100 gold coins and get a suit of armor" is completely supported. As is "Buy the suit of armor for $2.99" and as is "Buy the suit of armor and get 100 gold coins as a bonus"). It should be appreciated that there is nothing "special" about virtual goods or currency, and they are simply described as a convenient example and are in no way indicative of limitations of the invention. Described are dynamic pricing, price increases and decreases, and bonus currency and goods. The invention may further comprise real world offers—"Buy 500 gold coins for $4.99 and receive a free meal at Olive Garden" or the incorporation of charitable donations (e.g. "20% of money spent today goes to charity"). Additionally, examples described use the concept of a "payment wall", but it should be appreciated that this approach is not required—dynamic pricing is similarly applicable to "one-time" or "single-shot" offers, and with other purchase flows.

Figure 7:
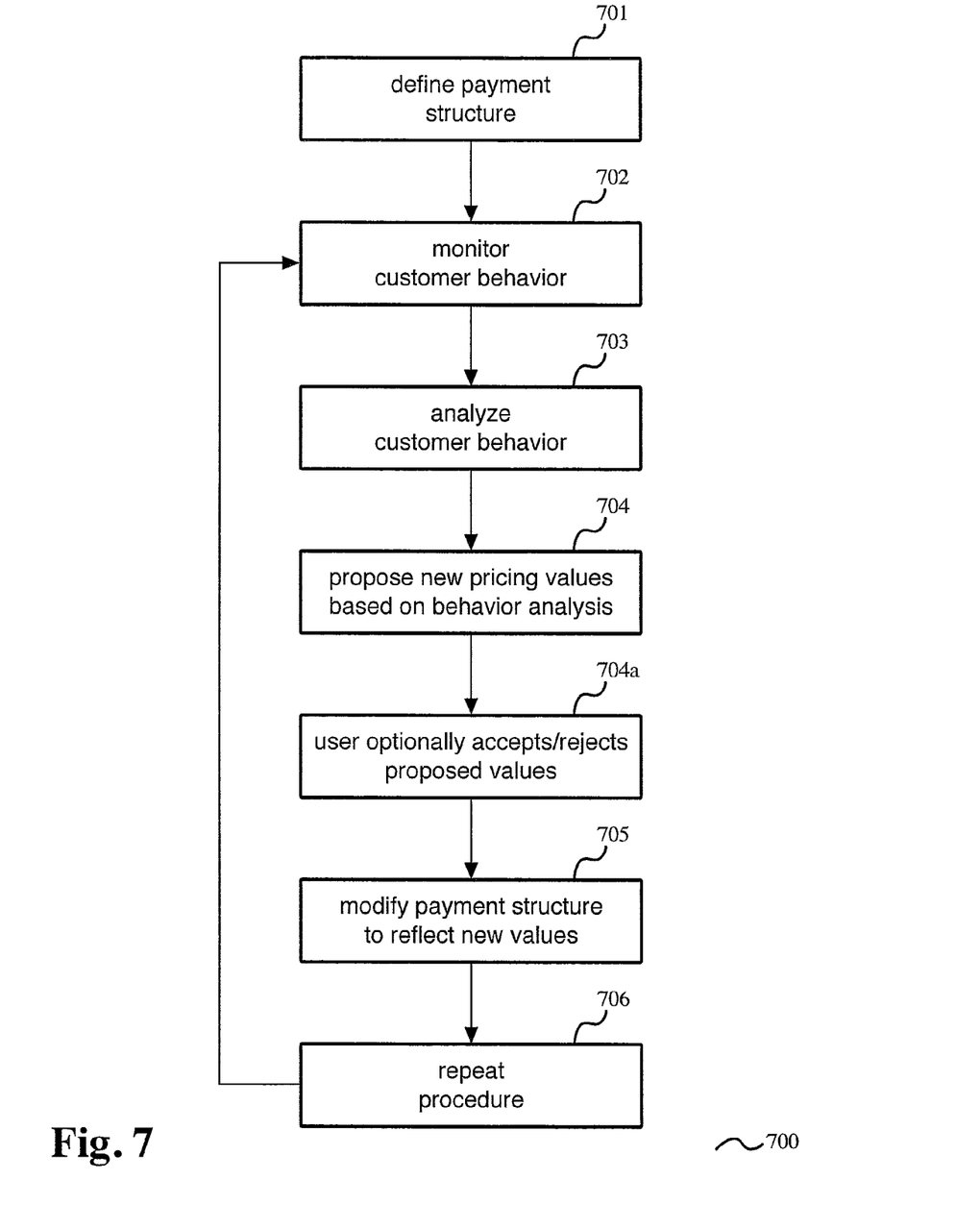
FIG. 7 is a method flow diagram illustrating an exemplary method for dynamic configuration of parameterized psychologically friendly payment structures, according to a preferred embodiment of the invention.

FIG. 7 is a method flow diagram illustrating an exemplary method 700 for dynamic configuration of parameterized psychologically friendly payment structures, according to a preferred embodiment of the invention. In an initial step 701, a pricing engine may define a payment structure such as for example a set of price values for use in a paywall for electronic entertainment applications (exemplary means of base paywall generation are described below). In a next step 702, customer behavior may be monitored such as through the use of a software API that may be connected to, or integrated with, products or service in use by the customer. Behavior data may be received by a customer segmentation server that may then, in a next step 703, analyze the behavior data such as to identify patterns or causal relationships (for example, identifying when and why customer behavior changes noticeably). In a next step 704, the behavior analysis results may be used, such as by a pricing analysis server in communication with a customer segmentation server, to propose new price values as appropriate (for example, in response to behavior changes based on the previous values, such as customers avoiding products they feel are not a good value for the price). Optionally in a substep 704a, proposed values may be presented to a pricing console for review and optionally approval or rejection by a user, facilitating an interactive price modification process when appropriate. In a final step 705, proposed values may be presented to a pricing engine that may then update the payment structure accordingly, such as modifying or replacing values as appropriate. In an optional iteration step 706, operation may continue in an iterative loop from a previous step 702, facilitating an automated or semi-automated operation as appropriate according to a particular arrangement.

Generation of Initial Set of Base Payment Walls

According to the invention, it becomes possible to generate enough payment walls to support an initial rule set, and to outline the space of possible payment walls in a way that makes sense to an end user.

As an example, begin with two different currency multiplication rates: all doubling; and doubling, doubling, then tripling. A pricing engine (as described above, referring to FIG. 5) may then produce three discount exchange rates, corresponding to:

```
DISCOUNT_TABLE_TYPE = (
    (DiscountTableType.DEFAULT, "Default"),
    (DiscountTableType.MINIMAL_DISCOUNTING, "Minimal Discounting"),
    (DiscountTableType.MAXIMAL_DISCOUNTING, "Maximal Discounting"),
)
```

Base Row

This is a place that may include the most variation. As an example, begin with three exchange rates, as may be produced by a pricing engine.

```
most_expensive_from_currency_amount = models.IntegerField( )
most_expensive_to_currency_amount = models.IntegerField( )
standard_from_currency_amount = models.IntegerField( )
standard_to_currency_amount = models.IntegerField( )
least_expensive_from_currency_amount = models.IntegerField( )
least_expensive_to_currency_amount = models.IntegerField( )
```

There may also three base amounts of currency to buy: Let X be the minimum amount from:

```
good_amount_of_currency_spent_daily = models.IntegerField( )
minimum_useful_amount=models.IntegerField( )
```

Starting currency amounts may be X, 2X, and 4X.

This produces 9 base rows, and 54 pre-manufactured payment walls (2×3×9) encompassing a pretty wide range of behaviors. And it doesn't begin to encompass initial grants, bonuses, etc. (the state space representation of pricing components is, in all its complexity, huge. This may be seen as positive—it means that giving people a good starting point is huge value, and it means that multi-armed bandits to explore the space is a compelling value prop). These should be named well, and consistently, so that power users can easily spot their walls.

Figure 8:
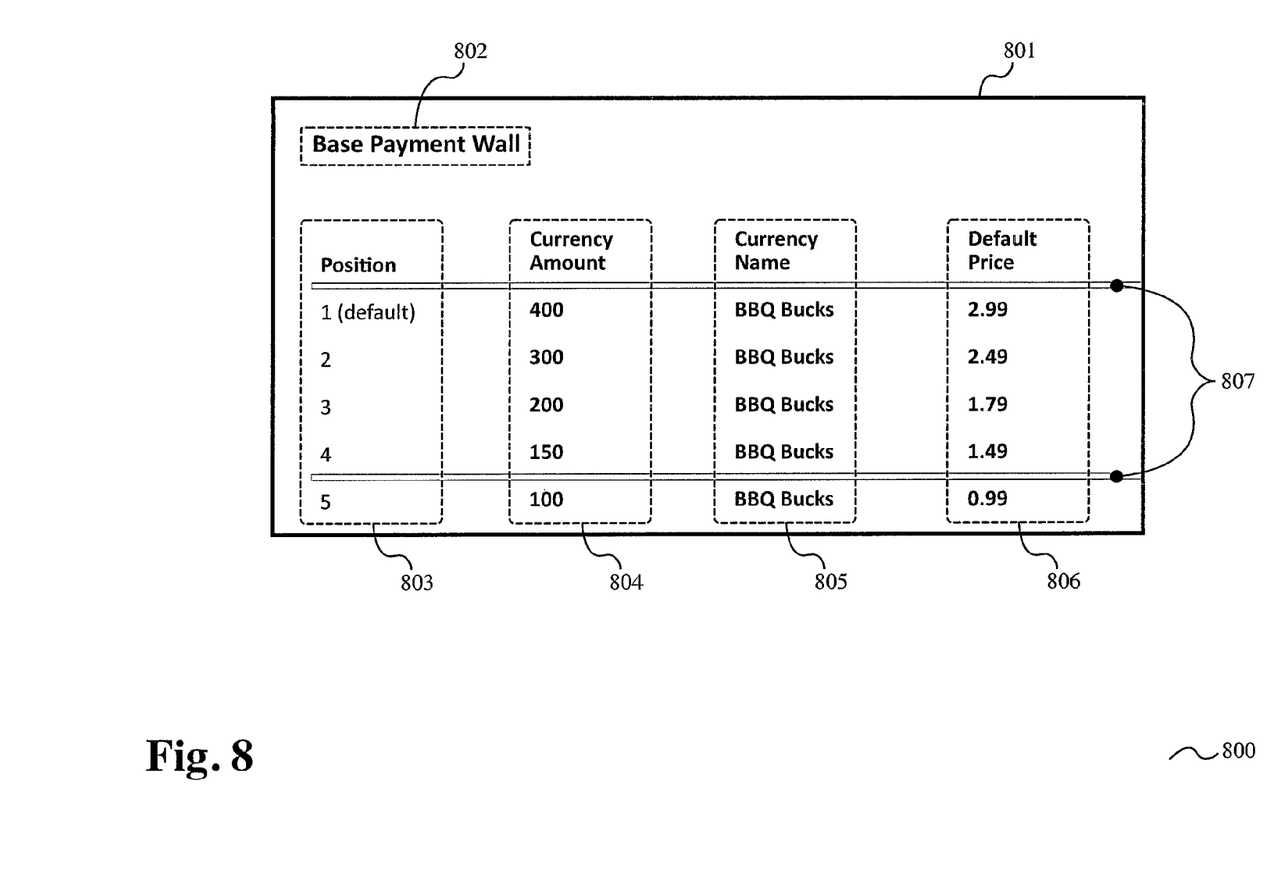
FIG. 8 is an illustration of an exemplary parameterized payment structure interface, illustrating the use of ranked pricing values according to the invention.

FIG. 8 is an illustration of an exemplary parameterized payment structure interface 800, illustrating the use of ranked pricing values according to the invention. As illustrated, an interface 800 may comprise a paywall display 801 that may be either read-only (such as for viewing a paywall, for example to review existing payment values) or interactive (such as to enable a human user to change payment values or provide feedback), interchangeably according to the embodiment. A display 801 may further comprise a title 802, generally suited to identify a paywall to a user for ease of use, a plurality of payment values or rules 803 that may identify sets of values or preconfigured rules for selecting or configuring values, a plurality of item values 804 such as to identify a quantity of an item available according to the pricing rule or for the price set by the price value, a plurality of item types 805 that may identify "what" is being purchased (as illustrated, the exemplary interface 800 shows a variety of "BBQ Bucks" quantities that may be purchased in an electronic gaming arrangement, but it should be appreciated that a variety of digital or physical goods and quantities may be utilized in various arrangements, according to the invention), and a plurality of price values 806 identifying the actual cost for a user to purchase the selected quantity or type of goods according to the paywall configuration. Additionally, as illustrated price values or rules may be sorted or otherwise organized, such as by rule-based or preconfigured ranking, and this organization may be identified using a plurality of visual dividers 807 or similar means of separating or organizing the information presented in a manner easily understandable to a user, to facilitate ease of use and minimize confusion or risk of error.

The following are exemplary payment structure details and approaches, and it should be appreciated that additional or alternate strategies may be utilized according to the invention.

Primary Data Model

According to the invention, a base payment wall may be parameterized such as by using the following exemplary attributes:
1. The hard currency being sold
2. The base RMT currency
3. Whether to be ascending or descending (this is a "display order" thing)
4. The "lowest value" row (cannot call this the bottom row, because ascending/descending is a parameterization).
   a. This is a price and an amount of currency.
5. A number of "slots" to have in the wall
6. A table of discount rates. The configurator asks for the basic ones here.
7. A table of currency multiplication rates, optionally a set of default values.
8. Whether to use psychologically friendly prices
   a. None
   b. Top 3
   c. All
9. Whether the wall is using psychologically friendly amounts
   a. None
   b. Top 3
   c. All With these, the exemplary algorithm described below functions effectively, and there are four different models of what "more expensive" means:

```
PRICE_VARIATION_MODEL_CHOICES =
((VARY_INITIAL_EXCHANGE_RATES, 'Vary changes in discount rates'),
(VARY_DISCOUNTED_EXCHANGE_RATES, 'Vary changes in discount rates'),
(VARY_CURRENCY_MULTIPLICATION_RATES, 'Vary how much currency is sold '),
(VARY_SIZE_OF_INITIAL_PURCHASE, 'Vary payment rungs (lowest RMT price)'),
)
```

Using these Algorithmically

The first thing to do is create an ordered list from the parameters. An exemplary default ordering may be: a base row currency amount being purchased; a currency multiplication table; a base row exchange rate; and a discount rate table.

It is important to note that this is described as a default ordering and as envisioned by the inventor is right for the majority of circumstances. This may then be reordered, such as using preferences indicated in a stored configuration: base row currency amount being purchased:

```
"first if VARY_SIZE_OF_INITIAL_PURCHASE"; base row exchange rate: "first if
VARY_INITIAL_EXCHANGE_RATES"; a discount rate table: "first if
VARY_DISCOUNTED_EXCHANGE_RATES"; and a currency
multiplication table: "first if
VARY_CURRENCY_MULTIPLICATION_RATE".
```

Key Points from the E-Commerce Manager User Experience

E-Commerce Managers are used to thinking in terms of "spend this much real money, get this much gold" perspective. Their mental model, and the way they will validate that the payment wall makes sense, works from that perspective. So they need to see the end result at all times. However, they should be encouraged to think of their walls in terms of the metadata, as this approach encourages a more thorough understanding and appreciation of the data model involved and encourages managers or other users to interact with the behaviors of a system and interact with choice-based testing or analysis (such as to determine "what to examine", or "how to examine it", for example), which in turns leads to more accessible, easily-understood reporting data. So it is needed for them (e-commerce managers) to think in terms of this data model. It can be appreciated, therefore, that what is needed is a UI that encourages "what if" style experimentation. The end user has to be able to change the metadata and see the outcome on the payment wall.

Actions the E-Commerce Manager Will Take on a Base Payment Wall Policy

Metadata Edits

These are the parameters initially taken from payment wall design guidelines that govern how to automatically adjust prices and amounts. Get initial values from the configurator data, but they are editable on a per payment wall basis (they also apply to adjustments).

Each of these should be adjustable on a per-payment-wall basis, as shown in the following exemplary code sample:

```
Class {
PaymentWallDesignGuidelinesParameters(AuditableParameterClass):
    use_psychologically_friendly_price_points
    use_psychologically_friendly_currency_amounts
    price_tag_ordering
    number_of_price_tags
    default_price_tag_selection }
```

Direct Edits of Prices and Amounts

Set the wall to manual and edit it directly. Once you do this, auto-compute the rest of the wall from the base prices will be turned off. Edit the prices directly. Direct editing of the price values. Don't do anything psychological with them (since they are directly asserted by the e-commerce manager). Edit the amounts directly. Don't do anything psychological with them (since they are directly asserted by the e-commerce manager). After you do manual editing, you can still "re-forex" and "re-label".

Parameterized Edits

A variety of parameterized edits may be performed on a paywall or on items within a paywall, such as (for example) any of the following: edit the currency multiplication rates table; edit the discount exchange rate table; regenerate the values from the base row (this discards all the values for anything other than the base, and then regenerates them); redo the labeling; redo the Forex/PPP conversation (this will refetch the forex and PPP rates); bump base price up; bump base price down; bump base amount up; bump base amount down; increase a slot gap (this is a one click operation that edits the currency multiplication table to make a slot have more currency); or increase all the gaps.

How Labels should Work

The messaging on the payment wall slots may be complex. Below is an exemplary code sample for a PriceTagDisplayInfo object:

```
class PriceTagDisplayInfoParameters(AuditableParameterClass):
    sub_heading = models.CharField(max_length=256,
        blank=True, null=True)
    badge = models.CharField(max_length=256, blank=True,
        null=True)
    extra = models.CharField(max_length=256, blank=True,
        null=True)
```

```
display_amounts_as_percent =
models.BooleanField(default=False)
```

These may map to locations on the price tag slots.

A library of such label objects may be utilized, and while editing a payment wall, a user may choose labels from the library. These labels may be reused repeatedly, and the person who defines the verbiage is different from the person who sets the values. This may produce a convenient way to implement colloquial labels such as "please translate these items", or other uses.

Labels and Template Variables

The end user, playing a game or running an application, simply sees a payment wall. The only complexity here involves how to represent the messaging. Suppose, for example, a base payment wall; a happy hour that globally gives people a 20% bonus; and a personalized discount. As a further example, it may be desirable to display the following exemplary payment wall slot. In order to facilitate this, eight or more "template variables" should ideally be supported:

```
%total_amount%; %bonus_amount%; %bonus_percent%;
%currency_singular_name%;
%currency_plural_name%; %real_world_currency_singular_name%;
%real_world_currency_plural_name%; and %item_name%.
```

The skilled person will be aware of a range of possible modifications of the various embodiments described above. Accordingly, the present invention is defined by the claims and their equivalents.

What is claimed is:

1. A system for presenting dynamic psychologically friendly pricing of in-app or in-game merchandise in online or mobile application environments in a plurality of currencies via a dynamic pricing system that produces price values based on customer behavior, in an online digital entertainment environment, comprising:

a pricing console computer comprising program code stored in a memory and adapted to operate an interface for receiving user interaction;

a database computer comprising program code stored in a memory and adapted to store information from the other components of the system;

a pricing engine computer comprising program code stored in a memory and adapted to generate at least a plurality of parameterized price values for a plurality of currencies;

a pricing analysis server computer comprising program code stored in a memory and adapted to analyze at least the price values and provide the analysis results to the pricing console; and a customer segmentation server computer comprising program code stored in a memory and adapted to receive customer interactions via a digital packet network and to generate customer behavior data values based at least in part on those interactions, and to provide the behavior data values to the pricing engine, wherein said pricing engine computer receives from said database computer values for an initial price range for each unit of said in-app or in-game merchandise within which said pricing engine computer sets a plurality of non-negotiable prices for a plurality of quantities of said in-app or in-game merchandise in a plurality of currencies;

wherein said pricing engine computer receives from said database a default pair of a price range and quantity of said in-app or in-game merchandise to be offered;

wherein said pricing engine computer converts each initial price range for each unit of said in-app or in-game merchandise within which said pricing engine computer is to set a plurality of non-negotiable prices into a plurality of currencies;

wherein, for each of said currencies, if at least one of the price ranges received from said database computer includes values with a plurality of first digits, said pricing engine computer selects a price for at least said default pair of a price range and quantity such that the first digit of said price is the lowest number of said plurality of first digits; and wherein for at least one of said plurality of currencies, said pricing engine computer selects a price for at least said default pair of a price range and quantity of said in-app or in-game merchandise so that the last digit of said price is a nine.

2. The system of claim 1, further comprising a software API comprising program code stored in a memory and adapted to collect customer behavior data values via a digital packet network and provide the customer behavior data to the customer segmentation server.

3. The system of claim 1, wherein the pricing engine produces price values based at least in part on the customer behavior data values.

4. The system of claim 1, wherein the pricing engine produces price values based at least in part on input from the pricing console.

5. The system of claim 1, wherein the customer segmentation server stores the behavior data in the database for future reference.

6. The system of claim 1, wherein the pricing analysis server analyzes at least the behavior data.

7. The system of claim 1, wherein the pricing analysis server generates recommendations based at least in part on the analysis results.

8. The system of claim 7, wherein the recommendations are provided to the pricing console for viewing by the user.

9. The system of claim 7, wherein the recommendations are stored in the database for future reference.

* * * * *